Patented June 3, 1952

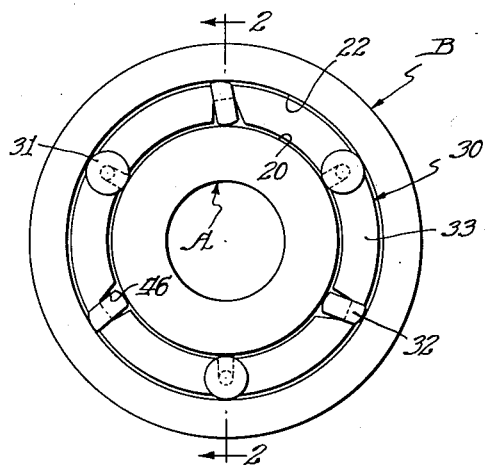
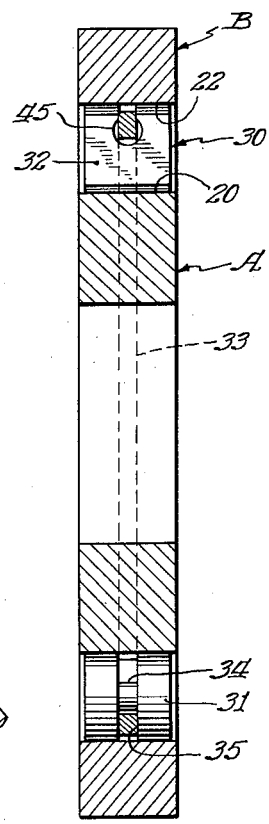
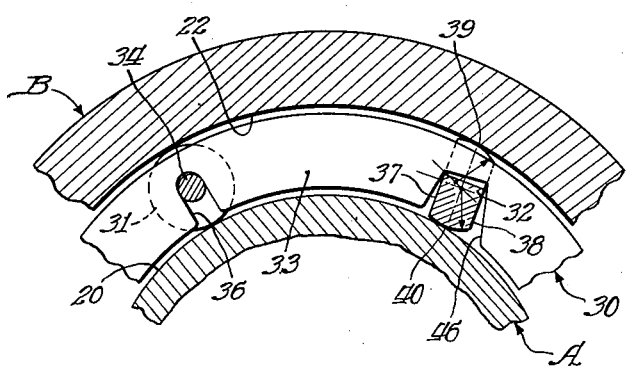
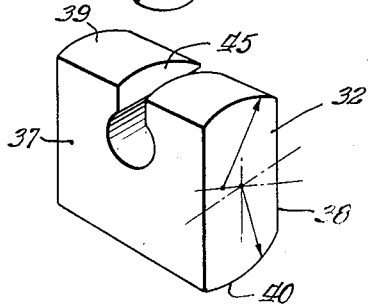
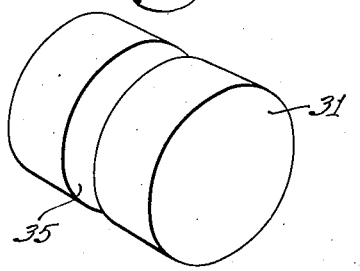

2,598,864

UNITED STATES PATENT OFFICE 2,598,864

COMBINED OVERRUNNING CLUTCH AND BEARING

Harold H. Turner, Rockford, Ill., assignor to Borg-Warner Corporation, Chicago, Ill., a corporation of Illinois Application December 11, 1946, Serial No. 715,451

6 Claims. (Cl. 192—45.1)

My invention relates to improvements in clutches and is particularly concerned with a combined overrunning clutch and bearing assembly which may be mounted between two races to reduce the friction therebetween for relative rotation in one direction and adaptable to prevent relative rotation in the opposite direction.

The invention seeks, as a principal object and accomplishment, to provide a combined overrunning clutch and bearing assembly such as contemplated herein and characterized by a combination of parts arranged and adapted to provide a compact assembly which will successfully combine the factors of structural simplicity and durability, and yet be economical to manufacture.

Another object and accomplishment of the invention is to improve the construction of combined overrunning clutch and bearing assemblies, as contemplated herein, with respect to efficiency of operation and economy in their manufacture; and to this end, a feature of the invention is to provide an overrunning clutch in general comprising a series of anti-friction rollers and a series of sprags alternately arranged between inner and outer spaced concentric races, the said rollers and sprags being held in place by an annular sprag carrier, said sprag carrier being operatively disposed between said inner and outer concentric races and intermediate of the ends of the sprags.

A further object of the invention is to provide a combined overrunning clutch and bearing in which the bearing and sprag parts are supported by a carrier member without the sacrifice of space between the races to accommodate the carrier.

The invention has for a further object the provision of a combined overrunning clutch and bearing in the form of a small compact unit which can be handled and installed as a unit.

A further object of the invention is to provide an effective overrunning clutch and bearing therefor that is made of few parts, that may be quickly assembled and which will operate instantaneously upon reversal of the rotation of a driving member.

The invention further contemplates the provision of a simply constructed overrunning clutch and bearing therefor that is capable of being made in small dimensions.

Additional objects, features and advantages of the invention disclosed herein will be apparent to persons skilled in the art after the construction and operation are understood from the within description.

I prefer to accomplish the various objects of this invention and to practice the same in substantially the manner hereinafter fully described and as more particularly pointed out in the appended claims, reference being had to the accompanying drawing which forms a part of this specification, wherein:

Fig. 1 is a side elevational view of an overrunning clutch embodying the present invention;

Fig. 2 is a sectional view of the overrunning clutch depicted in Fig. 1 and taken substantially on the plane of the line 2—2 in Fig. 1;

Fig. 3 is a fragmentary sectional view of the overrunning clutch depicted in Fig. 1;

Fig. 4 is a perspective view of a sprag such as contemplated for employment in the overrunning clutch depicted in Fig. 1; and Fig. 5 is a perspective view of a roller such as contemplated for employment in the overrunning clutch depicted in Fig. 1.

The drawing is to be understood as being more or less of a schematic character for the purpose of illustrating and disclosing a typical or preferred form of the improvements contemplated herein, and in the drawing like reference characters identify the same parts in the several views.

In the drawing, specifically Figs. 1, 2 and 3, I have illustrated the present overrunning clutch assembled in an operative position between a driving member, which I have designated in its entirety by the letter A, and a driven member, which I have designated in its entirety by the letter B. It is to be understood that in some applications it may be preferable to have the driving and driven members in reversed positions.

According to the present invention, the driving member A is provided with a smooth cylindrical peripheral surface 20 adapted to be employed as an inner race for the overrunning clutch to be hereinafter described in detail.

The driven member B is provided with a smooth inner cylindrical surface 22 concentrically arranged in spaced relationship with the race 20 and adapted to form an outer race for the overrunning clutch.

It will be observed that the arrangement of the overrunning clutch to be hereinafter described in detail is such as to effectively couple the driving and driven members in one direction of operation and to release these members when the direction of operation is reversed so that either the driving member or the driven member may be rotated independently of the other member.

Suffice it to say, since the invention is not particularly concerned with the precise construction of the driving and driven members, they will not be further described in detail. It is to be understood that details of construction of these members may be modified to suit particular conditions, and I do not wish to be limited to the details of construction of these elements as set forth.

Having thus described the general environment surrounding the combined overrunning clutch and bearing assembly with which the present invention is particularly concerned, the specific construction and the cooperating functions of the parts of said overrunning clutch and bearing assembly will now be described in detail.

In the exemplary embodiment of the invention depicted in Figs. 1, 2 and 3 the combined overrunning clutch and bearing assembly is designated in its entirety by the numeral 30 and is illustrated as arranged between the inner and outer concentric races 20 and 22 and comprises in general a series of anti-friction rollers 31 and a series of sprags 32 alternately arranged between the races. The rollers and sprags are held in place by an annular washer-shaped carrier indicated at 33, said carrier being operatively disposed between said concentric races and intermediate of the ends of the sprags.

The rollers 31 are shown in detail in Figs. 2, 3 and 5 as being of cylindrical shape and adaptable to roll on the races 20 and 22 and as having a reduced center portion 34 defining a recess 35 adaptable to be received into a recess 36 of the sprag carrier 33 which recess opens into the internal peripheral surface of said sprag carrier. Thus, the rollers bear on the races adjacent their outer ends and clear the races in the center.

In accordance with this invention, the sprags are formed with flat parallel sides 37 and 38 connected by arcuate portions 39 and 40 to form a generally parallelogram figure with diagonals of unequal length, thereby to cause the wedging angle to increase as the grip of the sprag on the races of the driving and driven members tightens which increases the torque capacity of the clutch. As is indicated in Fig. 3, the arcuate portion 39 is formed about a spaced center eccentric to the center line of the sprag and lying at a predetermined angle to a perpendicular to the surfaces 37 and 38. The arcuate portion 40 defines an arc whose center is preferably located on a center line through the sprag. It is notable that the surfaces 39 and 40 of the sprags are true arcs and the centers therefor are preferably so located as to produce a nearly constant wedge angle which I have found to produce satisfactory gripping ability without excessive bursting force.

The sprags may be made in any desired way, as by turning from bar stock, drawing through a die or the like. They are preferably hardened by heat treating or the like either before or after forming and may be finished by grinding or polishing after the heat treatment.

As shown in Figs. 2 and 3, each sprag is provided with a recess 45 adaptable to receive and be carried by portions of the sprag carrier 33, as shown. The sprag carrier 33 is further provided with recesses as at 46 adaptable to receive portions of the sprags and which are constructed with the sides thereof at predetermined angles so that the sprags may be rotated and the sprags will be engaged by said sides to restrict the rotation of the sprag when assembled in its operative position.

The sprags 32 normally lie at angles to radii struck through the center of the driving member A as shown in Fig. 3, and when tilted in this position, will permit clockwise rotation of the driving member A relative to the driven member B. If the driving member A should attempt to turn counterclockwise relative to the driven member B, or if the driven member B should overrun the driving member A the sprags 32 will be locked to a more nearly radial position and will bind against the races 20 and 22 to hold the driven and driving members against rotation with respect to each other.

It is notable that the arcuate surface 39 and the arcuate surface 40 of the sprags engage the races 22 and 20, respectively, in such a way that when the driving member A is rotating counterclockwise relative to the driven member B, the sprags tend to rotate into a position in which they wedgingly engage the races to prevent relative rotation between the driven and driving members. It is to be understood that the race of the driving member A will be free to rotate in a clockwise direction, as noted above, but if the driven member B should tend to overrun the driving member A in a clockwise direction, the engagement of the arcuate surfaces 39 and 40 of the sprags with their respective races will tilt the sprags and force them into tight engagement with the races, thereby locking the races against relative rotation.

It has been found particularly desirable to provide a slight freedom of relative movement in all directions between the sprags and the sprag carrier which will cause the proper seating of the sprags against their respective races. Moreover, in addition to the tilting movement of the sprags hereinbefore described, it is desirable to provide for movement of the sprags slightly at angles with respect to a line parallel to the axis of the driving member A to facilitate proper seating of the arcuate surfaces of the sprags with their respective races.

The combined bearing and clutch may be lubricated in any desired manner as by flow of oil therethrough from a system of the machine with which it is used or by being sealed in oil.

With the present arrangement and constructions of parts, the combined overrunning clutch and bearing, as contemplated herein, may be made in comparatively small dimensions. Heretofore, with the arrangements found in the prior art, it was not practical to construct a combined overrunning clutch and bearing of small dimensions as found in the present invention, and yet have the advantages found in the present invention.

It will be observed that the combined overrunning clutch and bearing contemplated herein may be quickly assembled by merely inserting the sprags 32 and the rollers 31 into their respective recesses and thereafter placing the assembled clutch in its proper operative position between the races 20 and 22 of the driving member A and driven member B, respectively. With this construction and arrangement of parts it can be seen that the worn sprags may be quickly replaced by removing the overrunning clutch from its operative position and inserting new sprags into the recesses in the sprag carrier. In like manner, the rollers may be easily and quickly replaced by removing the worn out roller or rollers from the sprag carrier and replacing new ones. In the event the sprag carrier should become worn, it may be easily and quickly replaced by removing the sprags and rollers therefrom and if they are in good condition, they may be replaced in their respective recesses in a new sprag carrier.

From the foregoing disclosure, it can be seen that I have provided an overrunning clutch and bearing assembly which efficiently fulfills the objects therefor hereinbefore set forth and provides numerous advantages which may be summarized as follows:

(1) Structurally simple, efficient and durable;
(2) Economical to manufacture and readily adaptable to mass production manufacture;
(3) Capable of being made in small dimensions; and
(4) Quick acting.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. In a combined bearing and one-way engaging device for use with co-axial outer and inner members, a series of wedge members each having on one side an arcuate surface adapted to be forced into frictional engagement with one of said members and having on its opposite side a wedge surface engageable with the other of said members, a series of anti-friction elements alternately arranged between said wedge members, and an annular carrier member operatively disposed intermediate the ends of said wedge members and said anti-friction elements and having a first series of recesses each adaptable to receive an anti-friction element and having a second series of recesses each adaptable to receive a wedge member, thereby to maintain and hold said anti-friction elements and said wedge members in spaced relationship.

2. In a combined bearing and one-way engaging device for use with relatively rotatable members in concentric spaced relationship, means adapted to be disposed between said members comprising an annular washer-shaped carrier provided with a first series of recesses and a second series of recesses alternately arranged, a plurality of sprags each adaptable to be received in one of said first series of recesses and to be operatively carried by said carrier when in assembled relationship, and bearing means including a plurality of anti-friction roller elements each adaptable to be received in one of said second series of recesses and to be operatively carried by said carrier when in assembled relationship, said carrier being adapted to be operatively disposed between said driving and driven members and intermediate of the ends of the sprags and said roller elements.

3. In a combined bearing and one-way engaging device for use with relatively rotatable members, an annular washer-shaped sprag carrier adapted to be disposed between said relatively rotatable members, a plurality of sprags operatively associated with said carrier when in assembled relationship, and a plurality of anti-friction roller elements operatively associated with said carrier when in assembled relationship, said carrier being operatively disposed intermediate the ends of said sprags and said roller elements.

4. In a combined bearing and one-way engaging device for use with relatively rotatable members in concentric spaced relationship, an annular washer-shaped carrier member, a plurality of roller elements operatively associated with said carrier members, a plurality of wedge members each defining a parellelogram figure in section and having an arcuate portion and a second arcuate portion opposite to said first arcuate portion, each of said arcuate portions being adaptable to wedgingly engage said relatively rotatable members in one direction of rotation and to release in the opposite direction of rotation, said carrier member being disposed intermediate the ends of said wedge members and roller elements and engaging and holding said wedge members and roller elements in spaced relation.

5. A one-way engaging device for use with relatively rotatable members having opposed cylindrical concentric races, a series of wedge members adapted to be disposed between said races, a series of anti-friction elements alternately arranged with respect to said wedge members, each of said wedge members and anti-friction elements having an opening therein intermediate the ends thereof, and a washer-shaped member disposed intermediate the ends of said wedge members and said elements and received within said openings to hold and maintain said elements and said wedge members in spaced relationship.

6. In a combined bearing and a one-way engaging device for use with inner and outer cylindrical concentric races, means adapted to be engaged with said races to prevent relative rotation of the races in one direction, means engageable with said races to reduce friction therebetween, each of said aforementioned means being alternately arranged, and an annular carrier member adapted to be disposed between said concentric races and intermediate the ends of each of said aforementioned means, said carrier member engaging each of said aforementioned means to hold said aforementioned means in spaced relationship.

HAROLD H. TURNER.

REFERENCES CITED

The following references are of record in the file of this patent:

UNITED STATES PATENTS

| Number | Name | Date |
| --- | --- | --- |
| 1,362,011 | Kirby | Dec. 14, 1920 |
| 2,028,876 | Lotts | Jan. 28, 1936 |
| 2,051,116 | Walsh et al. | Aug. 18, 1936 |
| 2,113,116 | Dodge | Apr. 12, 1938 |
| 2,342,227 | Swenson | Feb. 22, 1944 |
| 2,365,062 | Dodge | Dec. 12, 1944 |
| 2,407,772 | Dodge | Sept. 17, 1946 |
| 2,570,290 | Turner | Oct. 9, 1951 |